Figure 1:
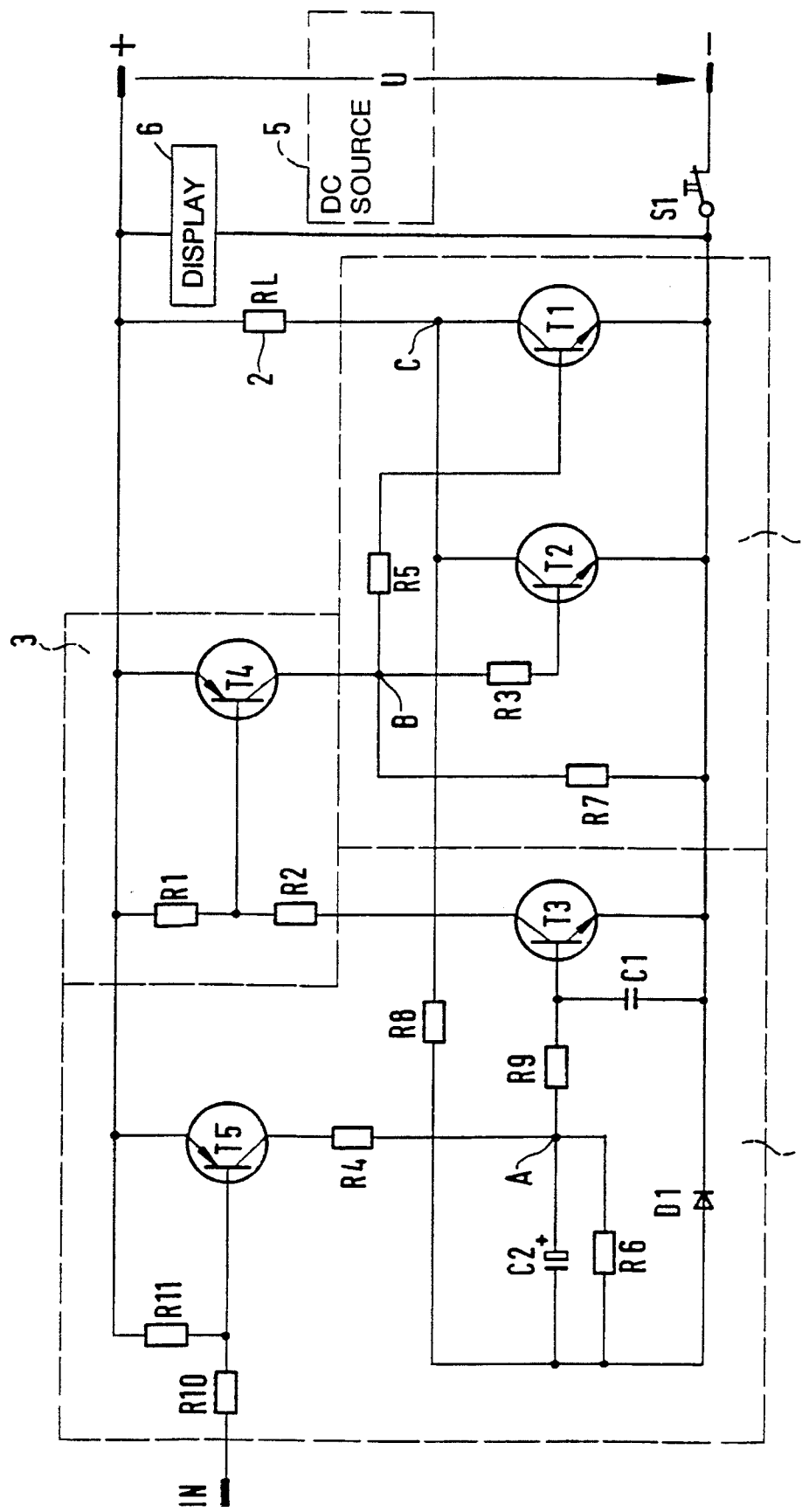

United States Patent [19]

Lang

[11] Patent Number: 5,619,126
[45] Date of Patent: Apr. 8, 1997

[54] CIRCUIT ARRANGEMENT FOR AUTOMATICALLY DECREASING THE LOAD CURRENT

[75] Inventor: Gerhard Lang, Altweilnau, Germany

[73] Assignee: Braun Aktiengesellschaft, Kronberg, Germany

[21] Appl. No.: 256,873

[22] PCT Filed: Nov. 9, 1993

[86] PCT No.: PCT/EP93/03137

§ 371 Date: May 17, 1995

§ 102(e) Date: May 17, 1995

[87] PCT Pub. No.: WO94/14229

PCT Pub. Date: Jun. 23, 1994

[30] Foreign Application Priority Data

Dec. 5, 1992 [DE] Germany .................... 42 41 066.5

[51] Int. Cl.⁶ .................................................. G05F 5/00
[52] U.S. Cl. .................... 323/273; 323/265; 323/274; 323/280; 323/281
[58] Field of Search .................... 323/265, 266, 323/271, 273, 274, 275, 276, 277, 278, 279, 280, 281, 282, 292, 304, 317

[56] References Cited

U.S. PATENT DOCUMENTS 4,001,668   1/1977   Lewis ................................ 323/19

FOREIGN PATENT DOCUMENTS

| 0249259 | 12/1987 | European Pat. Off. . |
| 3610035 | 9/1987 | Germany . |
| 3611484 | 10/1987 | Germany . |
| 4116318 | 11/1992 | Germany . |
| 4131981 | 4/1993 | Germany . |

*Primary Examiner*—Peter S. Wong
*Assistant Examiner*—Aditya Krishnan
*Attorney, Agent, or Firm*—Fish & Richardson, P.C.

[57] ABSTRACT

A circuit arrangement for automatically decreasing the load current includes a series arrangement formed by a load and a first electronic switching device and connected to a DC source of power. The first switching device is driven by a driver. The circuit further includes a control circuit controlling the driver. The control circuit is adapted to be initiated by a second electronic switching device, so that the second electronic switching device connects the first terminal of a capacitor and of a first resistor as well as the base of a transistor to one pole of the DC source of power, with the main current path of the transistor being between the input of the driver and the other pole of the DC source of power. The second terminal of the capacitor and of the first resistor is coupled to the other pole of the DC source, and the end of the first electronic switching device connected to the load is coupled to the second terminal of the capacitor through a feedback resistor.

16 Claims, 1 Drawing Sheet

CIRCUIT ARRANGEMENT FOR AUTOMATICALLY DECREASING THE LOAD CURRENT

This invention relate to a circuit arrangement for automatically decreasing the load current, comprising a series arrangement formed by a load and a first electronic switching device and connected to a DC source of power, the first switching device being driven by a driver, and further comprising a control circuit controlling the driver.

In prior German patent application P 41 31 981.8 a battery-powered appliance is described having an electrical load powered by the battery through an electronic switching device, and a display means for indicating the charge status of the battery. In the use of a direct-current motor as the load as, for example, in a rechargeable electric shaver, a pulse duration modulator operates to reduce the rotational frequency of the motor down to "zero" value when the charge-status indicator reaches "zero" value or when the battery voltage falls below a specified value. In this arrangement, accordingly, the load current is decreased from outside by a pulse duration modulator. Such a load current decreasing arrangement may be used, for example, for protecting the battery (the accumulator.) from deep discharges.

It is an object of the present invention to provide a simple and economical circuit arrangement for decreasing the load current automatically.

This object is accomplished in that in a circuit arrangement of the type initially described the control circuit is adapted to be initiated by means of a second electronic switching device, so that this second electronic switching device connects the first terminal of a capacitor and of a first resistor as well as the base of a transistor to the one pole of the DC source of power, with the main current path of the transistor being between the input of the driver and the other pole of the DC source, that the second terminal of the capacitor and of the first resistor is coupled to the other pole of the DC source, and that the end of the first electronic switching device connected to the load is coupled to the second terminal of the capacitor through a feedback resistor.

Advantageous embodiments will become apparent from the subclaims and the description.

An embodiment of the present invention will be described in more detail in the following with reference to the accompanying drawing.

FIG. 1 is a circuit arrangement for automatically decreasing load current.

The load 2 may be any electrical energy-absorbing device as, for example, a direct-current motor, being symbolically represented in the drawing by the load resistance RL. Connected in series with the load 2 is the parallel arrangement comprised of the two transistors T1 and T2 forming the first electronic switching device 1, with the collectors of the two transistors being connected to the load 2 (node C), while the emitters are coupled to reference potential. A DC voltage U may be applied to this series arrangement by means of a switch S1, with the positive pole of the voltage source residing at the load while the negative pole, representing reference potential in this embodiment, is present at the emitters of the transistors T1 and T2. The DC source 5 of power U may be, for example, the battery or the accumulator of a small electrical appliance as an electric shaver, for driving a direct-current motor providing the load 2. The bases of the transistors T1 and T2 are connected, through base resistors R5 and R3, respectively, to the collector of a transistor T4 forming the driver (node B). Further, the collector of the transistor T4 (node B) is connected to reference potential through a resistor R7, its emitter being coupled to the positive pole of the voltage source U. The base of the transistor T4 is connected to a voltage divider formed by resistors R1 and R2, with the resistor R1 being connected to the positive pole of the voltage source U, while the resistor R2 is connected to the collector of a transistor T3 forming part of the control circuit 4. The emitter of the transistor T3 is connected to reference potential.

Through a base resistor R9, the base of the transistor T3 is connected to the junction point A and, through a capacitor C1, to reference potential. Connected to this junction point A are both the first terminals of a capacitor C2 and a resistor R6 and, through a resistor R4, the collector of a transistor T5 forming the second electronic switching device, its emitter being coupled to the positive pole of the power source U. The second terminals of the capacitor C2 and of the parallel-connected resistor R6 are connected to reference potential through a diode D1. Alternatively, the second terminal of the resistor R6, in lieu of being connected to reference potential through the diode D1, may also be directly connected to reference potential, or a further resistor may be connected directly from node A to reference potential (not shown). The second terminal of the capacitor C2 is further connected, through a feedback resistor R8, to the collectors of the transistors T1 and T2 (node C).

The IN terminal represents the input of the circuit arrangement, and it is connected through a resistor R10 to the base of the transistor T5. The base of the transistor T5 forming the first electronic switching device is connected, through a resistor R11, to the positive pole of the voltage source, causing the transistor T5 to be cut off automatically in the absence of an input signal.

The mode of function of this embodiment of a circuit arrangement for automatically decreasing the load current will now be explained in greater detail.

In operation under normal conditions, the IN input is a LOW level (reference potential), and the load 2 which is, for example, the direct-current motor of an electric shaver, may be turned on and off at will by means of the switch S1. The following consideration is based on the assumption that the source of power is a charged two-cell accumulator with an accumulator voltage of U =2.3 volts. With the switch S1 closed, the transistor T5 conducts, and the first terminal of the capacitor C2 (node A) is charged to 2.3 V–0.6 V=1.7 V, where 0.6 V is the forward voltage of the diode D1. Because this potential is also present at the base of the transistor T3, this transistor is equally conducting, causing also the transistor T4 to conduct. Through the conducting emitter-collector circuit, positive potential is present at the node B, and the transistors T1 and T2 of the electronic switching device 1 are equally fully conducting, causing the maximum load current to flow through the load 2. The right-hand terminal of the feedback resistor R8 is connected to reference potential through the collector-emitter circuits of the transistors T1 and T2.

When the IN input signal becomes a HIGH level (positive potential) which may be caused by a micro-controller, for example, with the criterion causing this condition being, for example, a drop of the battery voltage U below a specified value and/or the annunciation of a specified minimum charge, or the charge state "zero" of a display means 6 indicating the accumulator charge, the transistor T5 will be cut off. The transistor T5 will be cut off through the resistor R11 also if no IN input signal is present. The capacitor C2 then begins to discharge both through the resistor R6 and through the resistor R9, the base-emitter circuit of T3, the collector-emitter circuit of T1/T2, and through the resistor R8. All transistors, except T5, are still conducting.

When the potential at node A has dropped to 0.6 volts, approximately, the transistor T3 will begin to be non-conducting. This causes the potential at the base of the transistor T4 to rise. The instant of time from which the transistor T4 begins to be non-conducting depends on the R1:R2 resistance ratio of the resistors R1 and R2. The smaller this ratio, that is, the lower, for example, the resistance of resistor R1, the more rapidly the transistor T4 will begin to be non-conducting. Accordingly, by suitably dimensioning this resistance ratio, it is possible to determine the release time, that is, the elapsed time from the application of a HIGH level signal at the IN input until the beginning of the load current decreasing action. As soon as the driver transistor T4 starts to be non-conducting, the off period of the transistors T1 and T2 of the electronic switching device 1 will be initiated, and the load current through the load 2 will begin to decrease, which means that the rotational frequency of a direct-current motor which is employed as the load will begin to be reduced.

The collector-emitter voltage of the transistors T1 and T2 will then rise, that is, the potential at the node C will be increased, causing the capacitor C2 to be charged with reversed polarity through the resistor R8. As a result, the transistor T3 will be driven again slightly, causing the transistors T4 and T1/T2 to go into non-conduction only slowly, resulting in a continuous decrease of the load current. The charging current of the capacitor C2 will equally decrease, and the potential at the node C, that is, the collector-emitter voltage of T1/T2, will continue to rise. A negative voltage feedback thus occurs.

The charging current of the capacitor C2 becomes zero when the node C has reached the potential of 0.6 volts, that is, the forward voltage of the diode D1 which ties the left-hand terminal of the capacitor C2 to 0.6 volts. The load current becomes zero, that is, a motor used as the load stops running.

The period of time in which the load current is decreased, that is, the elapsed time from the beginning of the non-conductive state of the transistor T4 to the instant the load current is equal to zero, is essentially determined by the time constant of the time element comprised of the capacitor C2 and the resistor R8. The resistors R6 and R9 also exert a small influence. In a practical embodiment, the elapsed time from the initiation of the arrangement until the beginning of the decrease of the load current may be 30 seconds, for example, and another 30 seconds until the load current reaches zero level.

The capacitor C1 inserted between the base and the emitter of the transistor T3 suppresses any tendency of the control circuit to oscillate. The resistor R6 connected in parallel with the capacitor C2 ensures a complete discharge of the capacitor C2, so that also in cases where the switch S1 is opened during the decreasing action, this will not interrupt the action, that is, the load current decreasing cycle will be completed also with the switch S1 open. It is thereby ensured that when the motor is turned off by means of the switch S1 while the decreasing cycle is still proceeding, the motor does not restart on reclosing the switch (with a HIGH level signal still present at the IN input). To cancel the stopped condition of the motor, it is invariably necessary that a LOW level signal be again present at the IN input.

I claim:

1. A circuit arrangement for automatically decreasing a load current, comprising a series arrangement formed by a load and a first electronic switching device adapted to be connected to a DC source of power, and further comprising a driver driving said first switching device; a capacitor; a first resistor; a transistor; a feedback resistor; a control circuit controlling said driver; and a second electronic switching device initiating said control circuit, so that said second electronic switching device connects a first terminal of said capacitor and a first terminal of said first resistor as well as the base of said transistor to one pole of the DC source of power, with a main current path of the transistor being between an input of the driver and another pole of the DC source, wherein a second terminal of the capacitor and a second terminal of the first resistor is coupled to the other pole of the DC source, and wherein the end of the first electronic switching device connected to the load is coupled to the second terminal of the capacitor through said feedback resistor.

2. The circuit arrangement as claimed in claim 1, further comprising a diode and wherein the capacitor is connected to the other pole of the DC source of power through said diode.

3. The circuit arrangement as claimed in claim 1 or claim 2, wherein the first resistor is connected in parallel with the capacitor.

4. The circuit arrangement as claimed in claim 1, further comprising a second resistor and wherein the base of the transistor is connected, through said second resistor, to the first electronic switching device and to the first terminal of the capacitor.

5. The circuit arrangement as claimed in claim 1, further comprising a further capacitor inserted between the base of the transistor and the other pole of the DC source of power.

6. The circuit arrangement as claimed in claim 1, further comprising a voltage divider arranged between the one pole of the DC source of power and the main current path of the transistor and wherein the input of the driver is connected to the voltage divider.

7. The circuit arrangement as claimed in claim 1, wherein the second electronic switching device is non-conducting in the absence of an input signal.

8. The circuit arrangement as claimed in claim 1, wherein the DC source of power is selected from the group consisting of an accumulator and a battery.

9. The circuit arrangement as claimed in claim 1, wherein the load is a direct-current motor.

10. The circuit arrangement as claimed in claim 1, further comprising a switch and wherein the series arrangement formed by the load and the first electronic switching device is adapted to be connected to the DC source of power by said switch.

11. The circuit arrangement as claimed in claim 1, wherein the first electronic switching device comprises two parallel-connected transistors and respective resistors connecting the bases of the two parallel-connected transistors to the main current path of the driver which also comprises a further transistor.

12. The circuit arrangement as claimed in claim 1, further comprising a third resistor and wherein the output of the driver connected to the input of the first electronic switching device is connected to the other pole of the DC source of power through said third resistor.

13. The circuit arrangement as claimed in claim 1, wherein the second electronic switching device is initiated when the voltage of the DC source of power drops below a specified value.

14. The circuit arrangement as claimed in claim 8, further comprising a display means indicating a charge status of the accumulator, and wherein the second electronic switching device is initiated when a specified minimum charge or the charge status "zero" is annunciated.

15. The circuit arrangement as claimed in claim 6, wherein the resistance ratio of the voltage divider enables adjustment of a period of time that elapses from an initiation of the second electronic switching device until a beginning of a load current decreasing action.

16. The circuit arrangement as claimed in claim 1, wherein a time constant of a time element comprising the capacitor and the feedback resistor essentially determines the time elapsing from the beginning of the load current decreasing action until the load current reaches a value equaling zero.

* * * * *